US007330716B2

(12) United States Patent
Adkins

(10) Patent No.: US 7,330,716 B2
(45) Date of Patent: *Feb. 12, 2008

(54) WIRELESS COMMUNICATION SYSTEM

(75) Inventor: Kevin G. Adkins, Akron, OH (US)

(73) Assignee: Responsive Innovations, LLC, Akron, OH (US)

( * ) Notice: Subject to any disclaimer, the term of this patent is extended or adjusted under 35 U.S.C. 154(b) by 58 days.

This patent is subject to a terminal disclaimer.

(21) Appl. No.: 11/336,361

(22) Filed: Jan. 20, 2006

(65) Prior Publication Data

US 2006/0183436 A1 Aug. 17, 2006

Related U.S. Application Data

(60) Provisional application No. 60/645,021, filed on Jan. 21, 2005.

(51) Int. Cl.
*H04Q 7/20* (2006.01)

(52) U.S. Cl. ...................................... 455/416; 455/500

(58) Field of Classification Search ................ 455/571, 455/572, 573, 575.1, 90.3, 92, 95, 103, 73, 455/416, 526, 102, 132, 246.1, 500, 403, 455/550.1, 91, 2.01, 3.01, 420, 3.05, 59; 429/99; 434/322, 332, 350, 362; 725/24; 340/825.5, 539, 628, 584, 825.69, 577

See application file for complete search history.

(56) References Cited

U.S. PATENT DOCUMENTS 5,379,213 A 1/1995 Derks
RE35,449 E 2/1997 Derks
5,724,357 A 3/1998 Derks
6,021,119 A 2/2000 Derks et al.
6,665,000 B1 12/2003 Buehler et al.
6,784,748 B1 * 8/2004 Canyon et al. ............ 330/296
2003/0153263 A1 8/2003 Glass et al.
2003/0153321 A1 8/2003 Glass et al.
2003/0153347 A1 8/2003 Glass et al.
2003/0215780 A1 * 11/2003 Sarr et al. .................. 434/351
2003/0236891 A1 12/2003 Glass et al.
2004/0229642 A1 11/2004 Derks et al.

FOREIGN PATENT DOCUMENTS

EP 0 843 432 A3 12/1999
EP 0 697 773 B1 9/2002
EP 1 337 127 A1 8/2003
EP 1 427 228 A3 9/2004

OTHER PUBLICATIONS

RadioShack.com—Home & Office: Home security & safety: Remotes: 2-Way Find One, . . . , Tech Specs, pp. 1-2, Dec. 20, 2005 (http:www.radioshack.com/product/index.jsp).

* cited by examiner

*Primary Examiner*—Jean Gelin
(74) *Attorney, Agent, or Firm*—Benesch, Friedlander, Coplan & Aronoff LLP

(57) ABSTRACT

A wireless communication system is disclosed herein. The wireless communication system may include transmitter units and a receiver. In one embodiment, each transmitter has an address and logic programmed to perform the steps of receiving a user selection and, responsive to the receiving, repeatedly transmitting a wireless selection signal until a wireless acknowledgment signal is received. The wireless selection signal may include the address and the user selection. The receiver may include means to receive a wireless selection signal and logic programmed to transmit a wireless acknowledgment signal in response to the receipt of each wireless selection signal.

13 Claims, 7 Drawing Sheets

WIRELESS COMMUNICATION SYSTEM

PRIORITY

This application claims priority to U.S. provisional application Ser. No. 60/645,021, filed Jan. 21, 2005.

FIELD OF INVENTION

The present application relates to a wireless response system and method. More particularly, the present application relates to a wireless response system having a plurality of transmitters and at least one receiver and a method for using the same.

BACKGROUND

Audience response systems are employed to retrieve (or receive) responses from a group of individuals at a central location. Such systems may be used in classroom settings, corporate meetings, or in other gatherings of individuals. Wireless audience response systems may include at least one base unit and a plurality of handheld units. Each handheld unit typically includes a keypad for inputting user responses.

In one known embodiment, the base unit controls communication by, for example, polling each handheld unit. If a user has entered a response into the keypad, the response is transmitted to the base unit when the handheld unit is polled. After receipt of the response, the base unit may send an acknowledgment signal.

BRIEF DESCRIPTION OF DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes in the figures represent one example of the boundaries. One of ordinary skill in the art will appreciate that one element may be designed as multiple elements or that multiple elements may be designed as one element. An element shown as an internal component of another element may be implemented as an external component and vice versa. The drawings may not be to scale and the proportion of certain elements may be exaggerated for the purpose of illustration.

DETAILED DESCRIPTION

Figure 1:
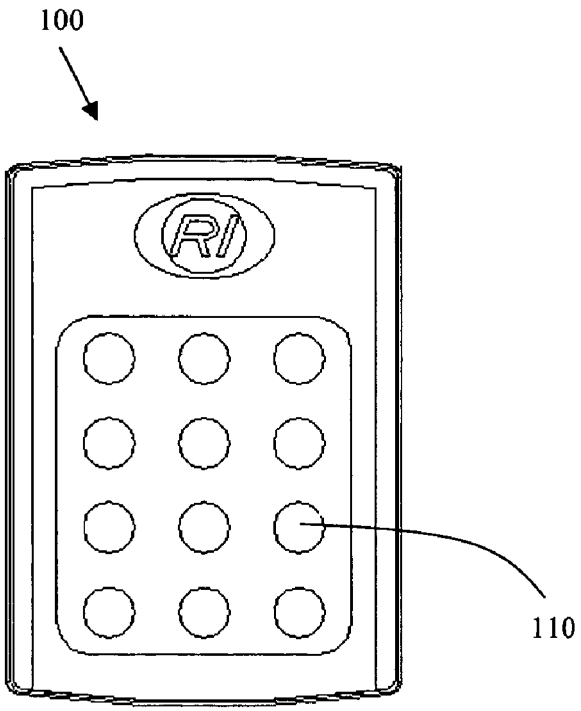
FIG. 1 is a simplified front plan view of one embodiment of a handheld device for a wireless response system.

This application describes a wireless response system and method of use. The system may include at least one handheld device and a base unit. The system may employ a single handheld device or several thousand handheld devices. The handheld device may be capable of transmitting and receiving information. The handheld device may also be referred to as a transmitter device or a handheld user transceiver.

Similarly, although the base unit is referred to as a "receiver," it may be capable of both transmitting and receiving information. The base unit may be referred to as a receiver or a central transceiver.

"Address", as used herein, includes but is not limited to one or more network accessible addresses, device identifiers, electronic identification numbers (such as EINs), IP addresses, url and ftp locations, e-mail addresses, names, a distribution list including one or more addresses, network drive locations, account numbers or other types of addresses that can identify a desired destination or device.

"Computer-readable medium", as used herein, refers to any medium that participates directly or indirectly in providing signals, instructions and/or data to one or more processors for execution. Such a medium may take many forms, including but not limited to, non-volatile media, volatile media, and transmission media. Non-volatile media may include, for example, optical disks, magnetic disks or so-called "memory sticks." Volatile media may include dynamic memory. Transmission media may include coaxial cables, copper wire, and fiber optic cables. Transmission media can also take the form of acoustic or light waves, such as those generated during radio-wave and infra-red data communications, or take the form of one or more groups of signals. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, a carrier wave/pulse, or any other medium from which a computer, a processor or other electronic device can read.

"Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmed logic device, memory device containing instructions, or the like. Logic may also be fully embodied as software.

"Signal", as used herein, includes but is not limited to one or more electrical or optical signals, analog or digital signals, one or more computer or processor instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User", as used herein, includes but is not limited to one or more persons, software, computers or other devices, or combinations of these.

FIG. 1 illustrates a front plan view of one embodiment of a handheld device 100 for a wireless response system. In the illustrated embodiment, the handheld device 100 may include a plurality of buttons 110 configured to accept a user input. In alternative embodiments, the handheld device may employ switches, dials, an LCD touch screen, a graphical user interface, or any other known interface configured to accept a user input. In one embodiment, the handheld device 100 has a length of less than 5 inches, a width of less than 4 inches, and a height of less than 0.75 inches. In an alternative embodiment, the handheld device has a length of 3.3 inches, a width of 2.1 inches, and height of 0.3 inches. In other alternative embodiments, the handheld device may be larger or smaller.

In one embodiment, the handheld device 100 is battery operated. The battery may be a removable battery, such as a AA or AAA size battery or a watch battery. In one embodiment, the handheld device 100 receives operative power from two (2) 3.0V batteries (not shown). Exemplary batteries include, without limitation, CR2032 coin cell lithium batteries, CR2320 coin cell lithium batteries, or CR1025 coin cell lithium batteries. In one embodiment, the batteries have a diameter of less than 1.25 inches and a height of less than 0.25 inches. In another embodiment, the batteries have a diameter of approximately 0.8 inches and a height of approximately 0.125 inches. When such batteries are used with one of the above described embodiments of the handheld device 100, the handheld device 100 has a length that is less than 5 times the diameter of one battery, a width that is less than 3 times the diameter of one battery, and a height that is less than 3 times the height of one battery. In one embodiment, two batteries may be stacked, one on top of the other. In another embodiment, the batteries may be placed side by side.

Figure 2:
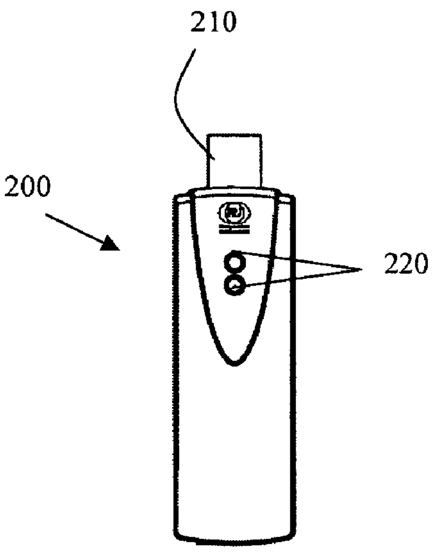
FIG. 2 is a simplified front plan view of one embodiment of a receiver for a wireless response system.

FIG. 2 illustrates a front plan view of one embodiment of a receiver 200 for a wireless response system. In the illustrated embodiment, the receiver 200 may include a connector 210 configured to be connected to a USB port of a computer. In alternative embodiments, the receiver may include a connector configured to be connected to a firewire or iLink port, a serial port, or any other known type of computer port. In another alternative embodiment, the receiver may wirelessly communicate with a computer via an infrared or RF transmitter. In yet another alternative embodiment, the receiver does not directly connect to a computer.

With continued reference to FIG. 2, the receiver 200 may include at least one LED 220. The LED 220 may be configured to indicate on/off status and transmission status. In alternative embodiments, the receiver may employ a dial, an LCD screen, or other known indicators. In another alternative embodiment, the receiver does not include any indicators.

In one embodiment, the receiver 200 has a length of less than 6 inches, a width of less than 2.5 inches, and a height of less than 1 inch. In an alternative embodiment, the receiver 200 has a length of 3.7 inches, a width of 1.1 inches, and a height of 0.4 inches. In other alternative embodiments, the receiver may be larger or smaller.

Figure 3:
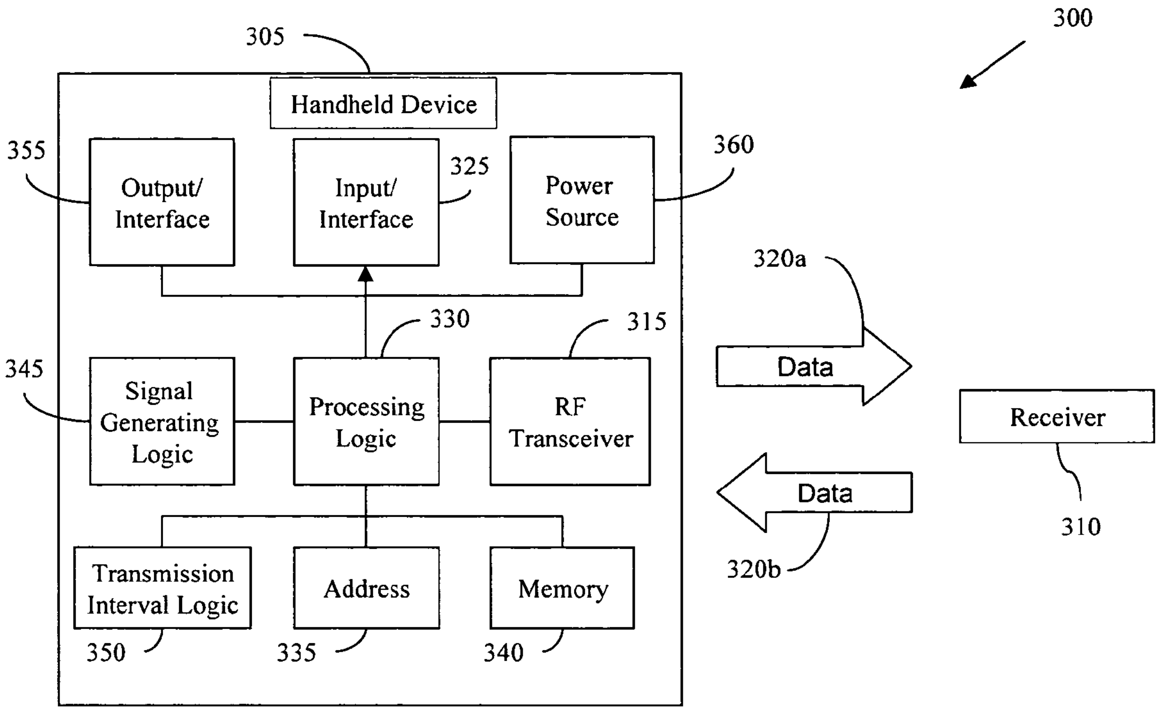
FIG. 3 is a simplified schematic drawing of one embodiment of a wireless response system including a handheld device in communication with a receiver.

FIG. 3 illustrates one embodiment of a wireless response system 300. In the illustrated embodiment, the system 300 includes at least one handheld device 305 and at least one receiver 310. The handheld device 305 includes a wireless data transmitter illustrated as a radio frequency (RF) transceiver 315 configured to transmit RF signals as shown at 320*a* and receive RF signals as shown at 320*b*. In one embodiment, the RF transceiver 315 may be configured as model RRRF-01, commercially available from Responsive Innovations, LLC. In an alternative embodiment (not shown), the handheld device may include an RF transmitter, but not a receiver or a transceiver. In another alternative embodiment (not shown), the handheld device may include an infrared (IR) source configured to transmit data and/or an IR sensor configured to receive data.

In one embodiment, the transceiver 315 transmits RF signals and receives RF signals on the same frequency or channel, or on the same band of frequencies or channels. In another embodiment, the transceiver 315 transmits RF signals at a first frequency (or first band of frequencies) and receives RF signals at a second frequency (or second band of frequencies).

As shown in FIG. 3, the handheld device 305 includes an input interface 325. Exemplary input interfaces include a keypad, an LCD touchpad, dials, toggle switches, levers, knobs, buttons, or any other appropriate control or input mechanisms.

In one embodiment, the transceiver 315 may transmit and receive RF transmissions on one of a plurality of different frequencies. The user may select the frequency through the input interface 325. In this manner, the user may select a frequency that has little or no local RF activity to avoid interference. In one embodiment, the user may select a frequency from 82 different frequencies. In an alternative embodiment, the user may select from more or fewer frequencies.

The input interface 325 is in communication with processing logic 330. When a user inputs a selection into the input interface 325, the user selection may be communicated to the processing logic 330. The processing logic 330 may then generate and format a signal for transmission. In one embodiment, the signal may include a stored address 335, and the user selection. The address 335 may be a number, a sequence of alphanumeric characters, a sequence of ASCII characters, and the like. In one embodiment, the address 335 is permanently assigned to a handheld device 305 and stored in a computer-readable medium, such as a memory 340.

In an alternative embodiment (not shown), an address may be generated upon the occurrence of a predetermined event. For example, the processing logic 330 or other logic may randomly generate an address 335 each time a user inputs a selection or after a predetermined number of selections. In another embodiment, the receiver 310 may assign an address to each handheld device 305, or the user may enter an identifier.

With continued reference to FIG. 3, the processing logic 330 is shown to be in communication with signal generating logic 345. After the processing logic retrieves the address 335, the processing logic 330 sends the user selection and the address 335 to the signal generating logic 345. The signal generating logic 345 may generate an RF signal that encodes the user selection and the address. In an alternative embodiment (not shown), the processing logic 330 may perform the step of generating an RF signal.

The processing logic 330 may also be in communication with the RF transceiver 315. After the RF signal is generated, the processing logic 330 instructs the RF transceiver 315 to transmit the RF signal as shown at 320*a*. The RF signal may also be referred to as a wireless selection signal. In one embodiment, the RF signal is transmitted until an acknowledgment signal is received or for a predetermined amount of time.

As illustrated in FIG. 3, the processing logic 330 may be in communication with a transmission interval logic 350. The transmission interval logic 350 generates a transmission interval. The transmission interval is an amount of time or clock cycles that elapse between transmission attempts of the RF signal. In one embodiment, the transmission interval is generated on the order of microseconds. In alternative embodiments, the transmission interval is generated on the order of seconds, milliseconds, nanoseconds, picoseconds, femtoseconds, attoseconds, or any other known measurement of time. The transmission interval can be optimized by a number of factors, such as: the number of handheld devices, the number of receivers, the number of users, the frequency of which questions are asked by a moderator, the frequency of the RF signal, the amount of data being transmitted, and the type of data being transmitted.

In one embodiment, the transmission interval logic 350 generates a transmission interval by generating a random number. In another embodiment, the transmission interval is calculated according to a mathematical function. For example, the transmission interval may be calculated by multiplying the address 335 by programmed constant or by a random number. In another embodiment (not shown), the transmission interval may be generated by the processing logic 330. In yet another alternative embodiment (not shown), a unique transmission interval may be a fixed, predetermined number and stored in memory 340.

In another alternative embodiment, the time interval may vary with each retransmission of a selection. For example, the time interval may become progressively longer after each retransmission. In one embodiment, the transmission interval may be calculated according to the formula $t_n=r+n(\epsilon)$, where $t_n$ is the time interval for the $n^{th}$ iteration, r is a random number that is either predetermined or generated with each user selection, n is the number of current iterations, and $\epsilon$ is a small number relative to r. In this embodiment, for example, the transmission interval after the first transmission may be 5 ms, the transmission interval after the first re-transmission may be 5 ms+100 μs, the transmission interval after the second re-transmission may be 5 ms+200 μs, etc.

The handheld device 305 transmits the RF signal at a user selected frequency or at a default frequency, according to the transmission interval. In other words, the RF transceiver 315 transmits the RF signal, then pauses for a length of time equal to the transmission interval, then repeats the transmission. This process may be repeated for a predetermined number of transmissions, a predetermined length of time, or until an acknowledgment signal is received. In one embodiment, the process repeats until the first occurrence of: (a) the receipt of an acknowledgment signal or (b) eight (8) seconds elapse after the first RF transmission. In an alternative embodiment, the predetermined length of time may be five (5) seconds. In another alternative embodiment, there is no predetermined length of time for terminating the transmission. In yet another alternative embodiment, the predetermined length of time may be programmable by a user.

The transmission interval may serve several functions. For example, using a transmission interval may conserve power, because sending a transmission intermittently may use less power than sending a continuous transmission. Further, when a single receiver 310 is receiving RF signals from a plurality of handheld devices 305, the use of different transmission intervals staggers the RF signals, such that they will arrive at the receiver 310 at different times. Additionally, some known transceivers may not be capable of simultaneous or near simultaneous receiving and transmitting of an RF signal. If such a transceiver is employed, the transmission interval allows the RF transceiver 315 to receive an acknowledgement signal at a time when it is not transmitting an RF signal.

With continued reference to FIG. 3, the handheld device also includes an output interface 355. In one embodiment, the output interface 355 indicates operating status to a user such as: that a signal is being transmitted, that an acknowledgment has been received, that user entry has been confirmed, and the like. In such an embodiment, one or more LEDs, an LCD, or other display may serve as an output interface 355.

In one exemplary embodiment (not shown), the handheld device 305 employs a three color LED arrangement selected for the low power requirements of LED technology. In this embodiment, the LED flashes a first color (such as amber) to indicate that the handheld device 305 is transmitting an RF signal. The LED emits a solid (i.e., non-flashing) second color (such as green) to indicate that an acknowledgement signal has been received and the data has been accepted by the receiver 310. The LED emits a solid third color (such as red) to indicate that no acknowledgement signal has been received and the transmission has been terminated unsuccessfully. In an alternative embodiment, the handheld device 305 may employ a fourth LED display to indicate that an acknowledgment signal is received, but the user selection was not accepted by the receiver 310.

In another embodiment, the output interface 355 may include an LCD. A first display message indicates that the handheld device 305 is transmitting a signal, a second display message indicates that an acknowledgment has been received, and a third display message indicates that no acknowledgment has been received and the transmission has been terminated. Additionally, the LCD screen may display the user selection along with the transmission status.

In one embodiment, the handheld device 305 includes a power source 360, such as a battery. The power source 360 may be a removable battery, such as a AA or AAA size battery or a watch battery, which can be replaced when the power runs low. In one embodiment, the power source 360 includes two (2) 3.0V batteries. Exemplary batteries include, without limitation, CR2032 coin cell lithium batteries, CR2320 coin cell lithium batteries, or CR1025 coin cell lithium batteries.

In one embodiment, the handheld device 305 can transmit an RF signal when supplied with a current of 10.5 mA and can receive an RF signal when supplied with a current of 19 mA. In other embodiments, the handheld device can transmit an RF signal when supplied with a current of less than 15 mA and can receive an RF signal when supplied with a current of less than 25 mA.

Alternatively, the power source 360 may be more permanently fixed within the handheld device 305 and the handheld device 305 may be plugged into an external power source to recharge the power source 360. In another embodiment (not shown), the handheld device may alternatively be configured to be plugged into an external power source or employ photovoltaic panels.

Figure 4:
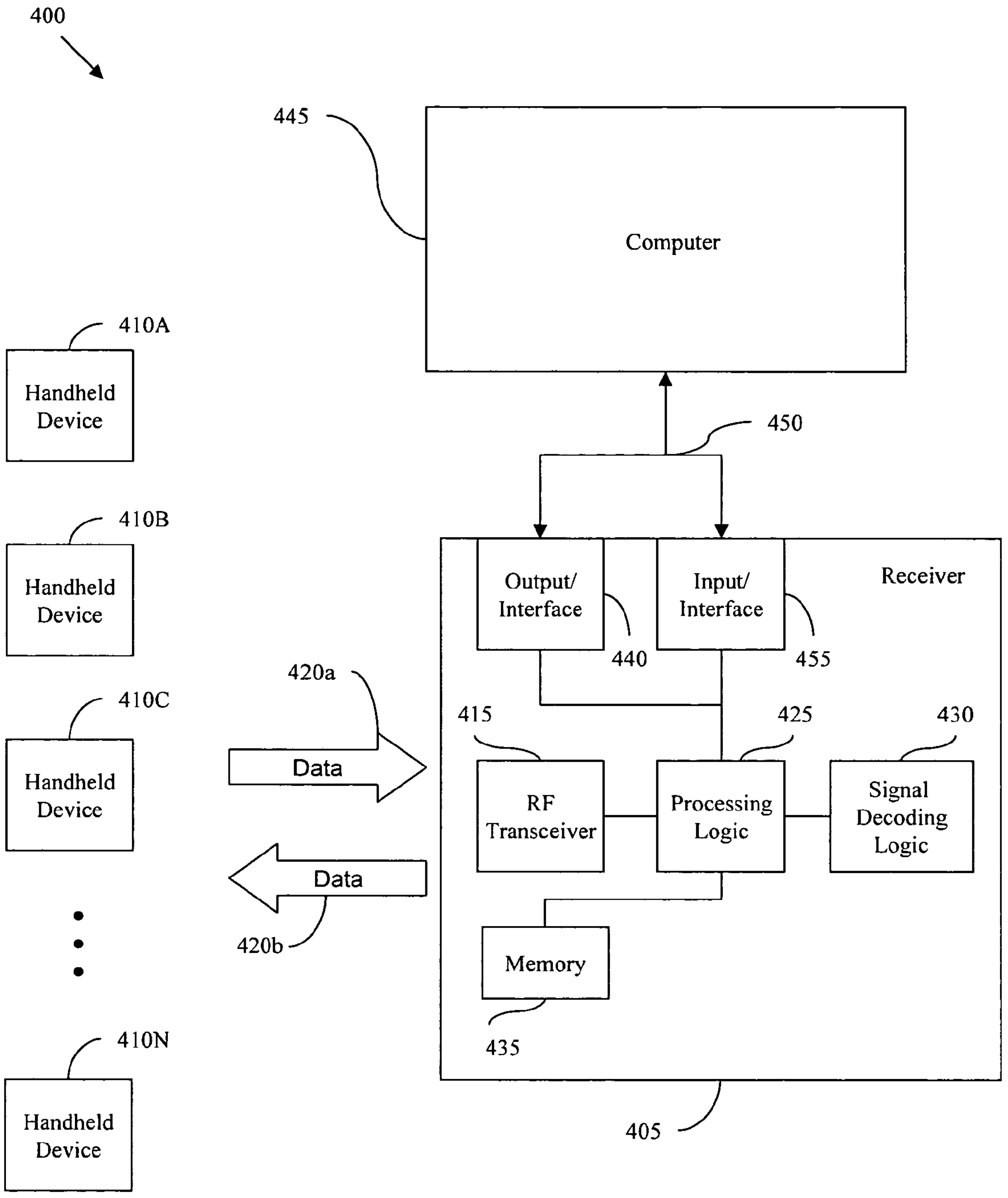
FIG. 4 is a simplified schematic drawing of one embodiment of a wireless response system including a receiver in communication with a plurality of handheld device.

FIG. 4 illustrates a simplified schematic drawing of one embodiment of a wireless response system 400, having a receiver 405 in communication with a plurality of handheld devices 410A-N. The handheld devices 410A-N may be substantially similar to the handheld device 305 illustrated in FIG. 3. It should be understood that the receiver 405 may be in data communication with a single handheld device or many handheld devices.

As shown in FIG. 4, the receiver 405 includes an RF transceiver 415 configured to receive an RF signal as shown at 420*a* and send an RF signal as shown at 420*b*. In an alternative embodiment (not shown), the receiver may include an RF receiver, but not a transmitter or a transceiver. In another alternative embodiment (not shown), the receiver may include an infrared (IR) sensor configured to receive data and/or an IR source configured to transmit data.

The receiver 405 further includes processing logic 425 in data communication with signal decoding logic 430. In this embodiment, when a signal is received by the RF transceiver, it is communicated to the processing logic 425. The processing logic may instruct the signal decoding logic 430 to decode and parse the signal. The signal decoding logic 430 decodes the signal and parses the signal into components including a user selection and an address. In an alternative embodiment (not shown), the processing logic 425 may decode and parse the signal.

In one embodiment (not shown), the receiver may have an ID. The processing logic may be configured to only accept signals that contain the receiver ID, thus ensuring that any collected data is not skewed by spurious signals. In one embodiment, a replacement receiver may have the same ID as a first receiver. In such an embodiment, the replacement receiver would accept signals from the handheld devices, without the need for reprogramming the handheld devices. In another embodiment, all manufactured receivers may have the same ID.

After the signal has been successfully decoded and parsed, the processing logic 425 may generate an acknowledgment signal that contains, for example, the address and an acknowledgment indicator. The acknowledgment signal may also include an indication of whether the user selection was accepted. The processing logic 425 may also instruct the RF transceiver 415 to communicate the acknowledgment signal over communication link 420*b*.

With continued reference to FIG. 4, the receiver 405 also includes a computer-readable medium such as a memory 435, configured, for example, as RAM, EEPROM, or other types of writable memory. In one embodiment, the user selection and/or the address are stored in the memory 435 after the signal has been decoded and parsed by the signal decoding logic 430. The storing of the user selection and/or the address may occur before, after, or concurrently with the transmission of the acknowledgment signal. In an alternative embodiment (not shown), the receiver does not have a writable memory and the user selection and unique identifier are instead only communicated to an external computer.

As further shown in FIG. 4, the receiver 405 includes an output interface 440. In the illustrated embodiment the output interface 440 is an interface for a computer 445. The computer 445 may be a PC, a laptop, a graphing calculator, or any other type of computer. The output interface 440 is in communication with the computer 445 via a hardwire connection 450. The hardwire connection 450 may connect to a USB port, a serial port, a firewire or ilink port, or any other type of port. In an alternative embodiment (not shown), the output interface 440 is in communication with the computer 445 via a wireless connection.

In the illustrated embodiment, the receiver 405 further includes an input interface 455. In an alternative embodiment (not shown), the receiver includes a single interface for both input and output. The receiver 405 may receive instructions from the computer 445 through the input interface 455, such as instructions to wipe the memory 435. In one embodiment, the input interface 455 receives power from the computer 445 through the connection 450. In an alternative embodiment (not shown), the receiver 405 may include an internal power source, such as a battery or external power means.

In an alternative embodiment (not shown), the receiver is not connected to an external computer. Instead, the output interface 440 is a display, such as an LCD display. In such an embodiment, the user selection and/or the address may be displayed on the output interface 440. In another alternative embodiment (not shown), the handheld device is not in communication with a computer during the communication of RF signals. Instead, data may be stored in the memory 435 and transferred to a computer 445 at a later time.

Figure 5:
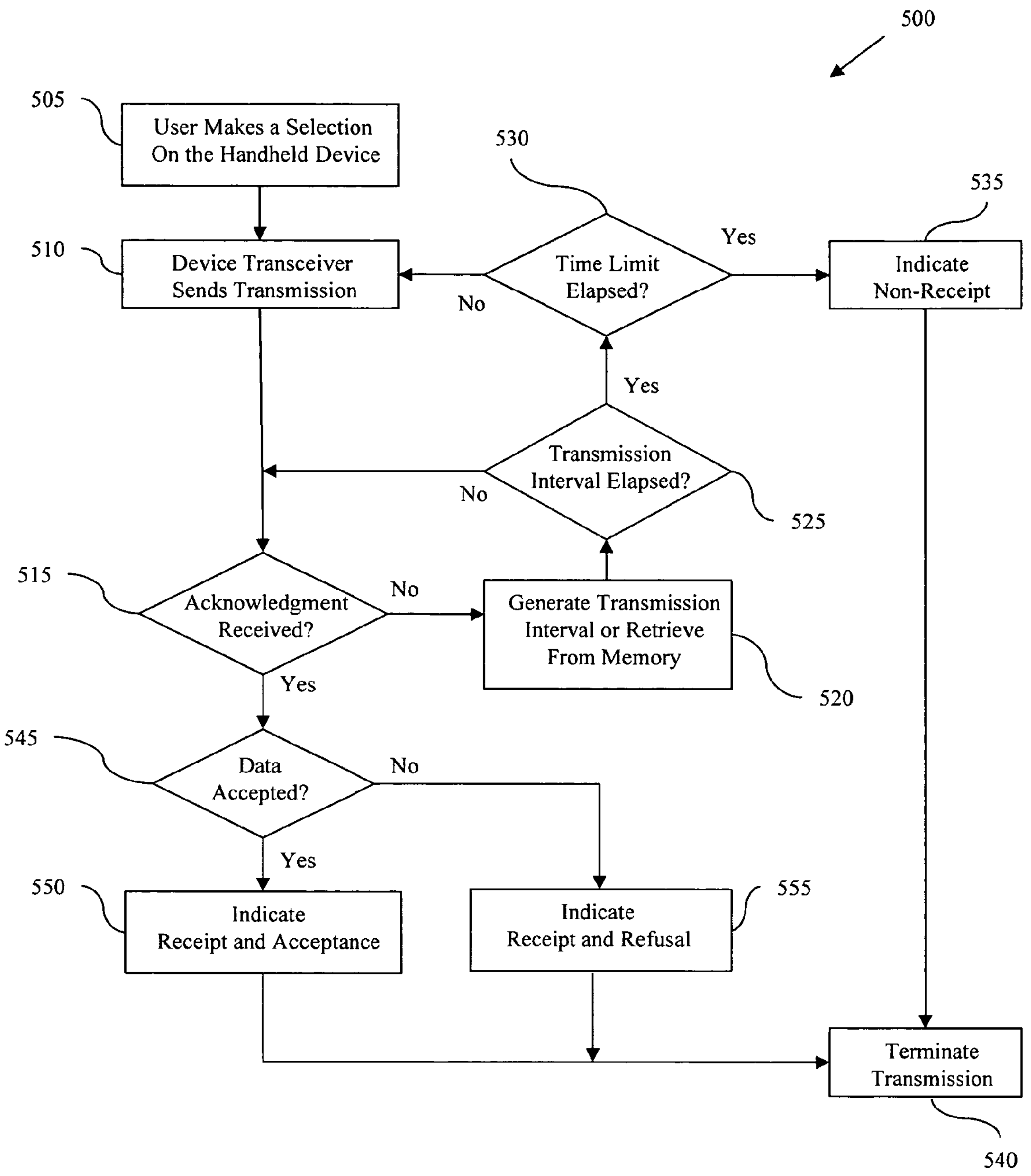
FIG. 5 is a simplified flow chart of one embodiment of a method for using a handheld device in a wireless response system.

FIG. 5 illustrates a flow chart diagram for an exemplary method 500 for using a handheld device in a wireless communication system. The user makes a selection, step 505, by selecting a button, turning a dial, etc. on the handheld device. After the user has made a selection, the handheld device communicates a signal that includes the user selection and an address, step 510.

The handheld device then waits for an acknowledgment signal, step 515. If an acknowledgment signal is not received, the handheld device generates or retrieves from memory a transmission interval, step 520, for example, as described above in reference to FIG. 3. The handheld device then determines whether the transmission interval has elapsed, step 525. If the transmission interval has not elapsed, the handheld device continues to wait for an acknowledgment signal, step 515. If the transmission interval has elapsed, then the handheld device determines whether a predetermined transmission time limit has elapsed, step 530. If the predetermined transmission time limit has elapsed, the handheld device indicates that no acknowledgment was received, step 535, and the handheld device terminates transmission, step 540. If the predetermined transmission time limit has not elapsed, the handheld device re-transmits the signal, step 510. The handheld device then waits again for an acknowledgment signal, step 515.

Once the handheld device receives an acknowledgment signal, step 515, it determines whether the acknowledgment signal indicates that the data was accepted, step 545. If the data was accepted, the handheld device indicates receipt and acceptance, step 550, and terminates transmission, step 540. If the data was not accepted, the handheld device indicates receipt and non-acceptance, step 555, and terminates transmission.

In one embodiment, the handheld device transmits an RF signal and receives an acknowledgment RF signal at the same frequency, or on the same frequency band. In another embodiment (not shown), the handheld device transmits an RF signal at a first frequency (or first frequency band) and receives an acknowledgment RF signal at a second frequency (or second frequency band) different from the first frequency (or first frequency band). In such an embodiment, the handheld device may transmit and receive signals concurrently.

Figure 6:
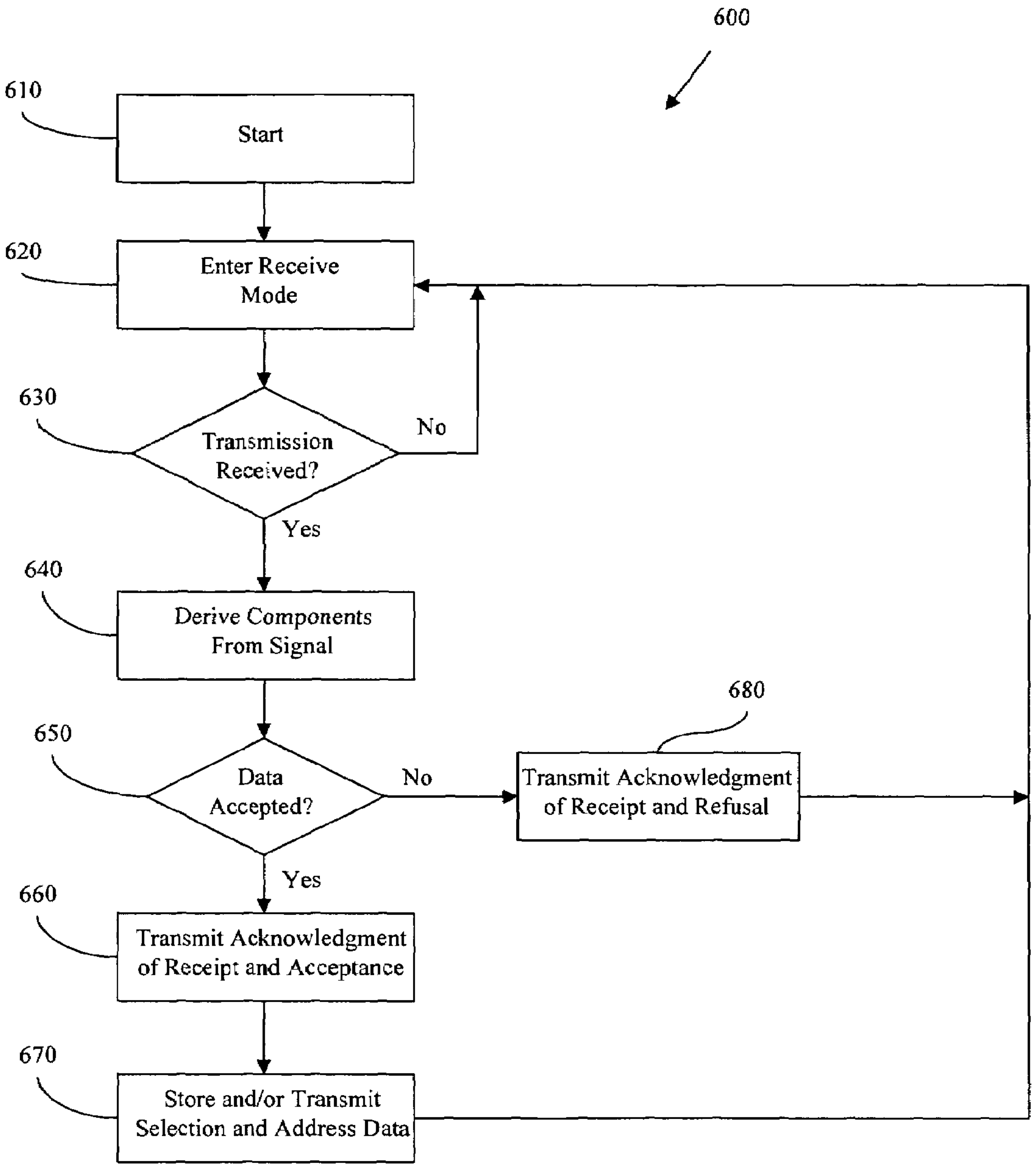
FIG. 6 is a simplified flow chart of one embodiment of a method for using a receiver in a wireless response system.

FIG. 6 illustrates a flow chart diagram for an exemplary method 600 for using a receiver in a wireless communication system. The receiver is first powered on, step 610, and enters a receive mode, step 620. In one embodiment, the receiver is powered on merely by plugging it into a USB port of a computer. While the receiver is in receive mode, it waits to receive a signal on a communication link, step 630. If no signal is received, the receiver remains in receive mode, step 620. Once a signal is received, the receiver may derive components from the signal such as user selected data or address data, step 640.

After the data has been derived, the receiver determines whether some or all of the data can be accepted, step 650. If the data is accepted, the receiver transmits an acknowledgment of receipt and acceptance, step 660, and the data is stored in the receiver's memory and/or transmitted to an external processor, step 670. The receiver then returns to receive mode, step 620. In another embodiment (not shown), step 670 may be performed before or concurrently with step 660. If the data is determined to be unacceptable, step 650, the receiver may transmit an acknowledgment of receipt and non-acceptance of data, step 680. The receiver then returns to receive mode, step 620.

Figure 7:
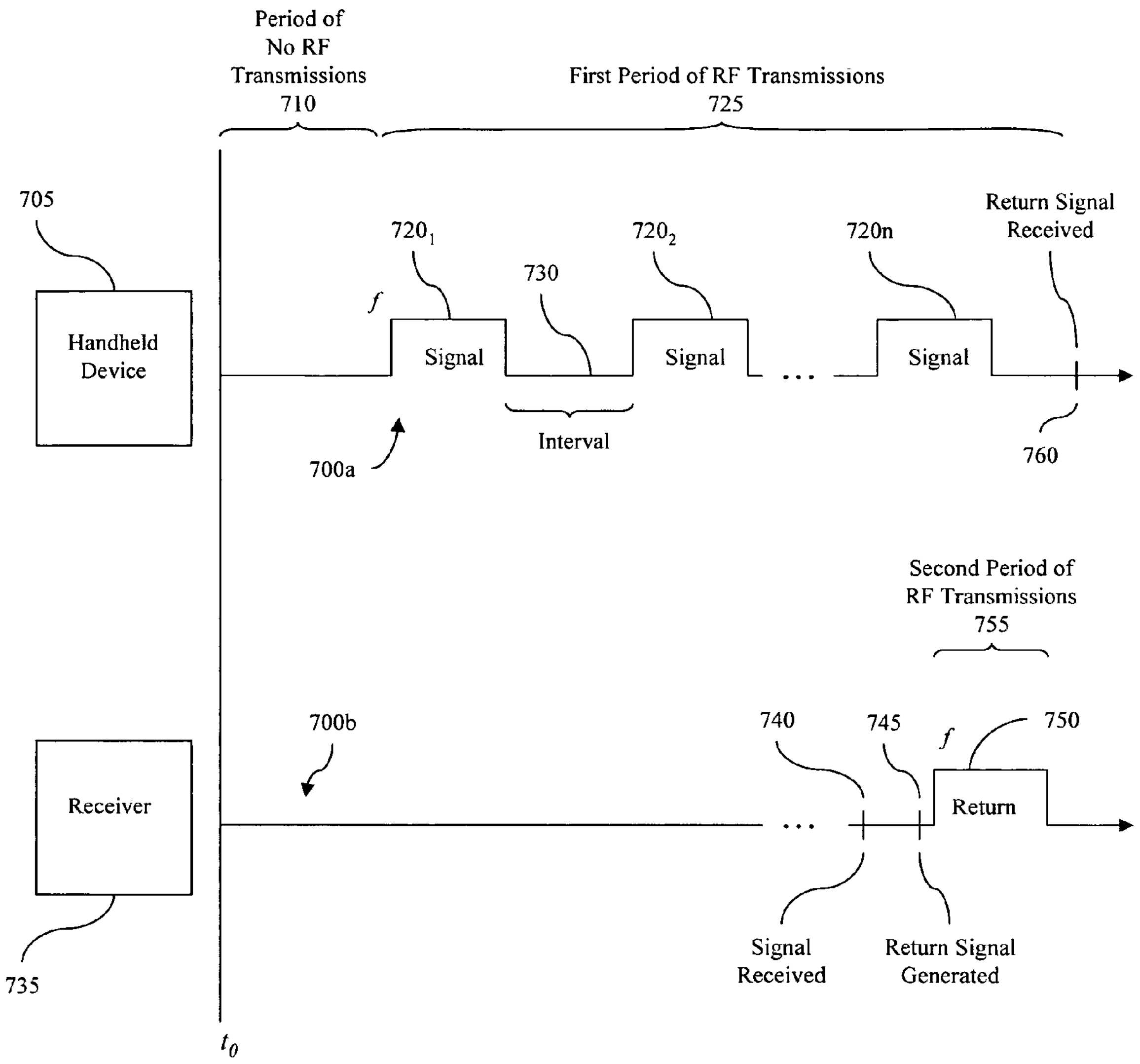
FIG. 7 is a simplified schematic drawing of RF profiles for a handheld device and a receiver in one embodiment of a wireless response system.

FIG. 7 illustrates a simplified schematic drawing of RF profiles 700*a* of a handheld device 705 in one embodiment of a wireless response system. In alternative embodiments, a plurality of handheld devices are employed. In the illustrated embodiment, the handheld device 705 makes no transmission until it receives a selection from a user. Thus, in RF profile 700*a*, there is a distinct period of no RF transmission 710. Upon a user entering a selection, the handheld device 705 transmits a first RF signal $\mathbf{720}_1$ at a frequency f thus initiating a first period of RF transmissions 725. The first RF signal $\mathbf{720}_1$ includes a user selection and an address, such as a unique address. In one embodiment, the first RF signal $\mathbf{720}_1$ lasts for a duration of 100 μs. The duration is a function of the amount and type of data and the frequency f.

After the handheld device 705 transmits the first RF signal $\mathbf{720}_1$, the RF profile 700*a* includes no RF signals for a period equal to a transmission interval 730. The transmission interval 730 may be generated or retrieved from memory, for example, as explained above in reference to FIG. 3. In one embodiment, the transmission interval lasts for a duration of 5 ms. After the transmission interval 730, the RF profile 700*a* includes additional RF signals $\mathbf{720}_{2\text{-}n}$. Each RF signal $\mathbf{720}_{2\text{-}n}$, is identical to the first RF signal $\mathbf{720}_1$, and is followed by a transmission interval 730. Thus, in one embodiment, during the first period of RF transmissions 710, there is a transmission frequency of one transmission every 5 ms. In another embodiment, the transmission interval 730 is variable. For example, the transmission interval 730 may be 5 ms after the first RF signal $\mathbf{720}_1$, then 5 ms+100 μs after the second RF signal $\mathbf{720}_2$, . . . and 5 ms+((n-1)*100)μs after the $n^{th}$ RF signal $\mathbf{720}_n$.

FIG. 7 further illustrates an RF profile 700*b* of a receiver 735 in one embodiment of a wireless response system. During the first period of RF transmissions described above, the receiver 735 receives one of the RF signals $\mathbf{720}_{1\text{-}n}$ transmitted by the handheld device 705, as shown at 740. The receiver 735 makes no transmission until it receives an RF signal.

Upon receipt of an RF signal at 740, the receiver 735 may identify user selection data and address data in the RF signal and determine whether to accept the user selection data. The receiver 735 then generates return data that includes the address data, as shown at 745. The receiver 735 communicates return data as at least one RF return signal 750 at the frequency f, thus initiating a second period of RF transmissions 755 that overlaps with the first period of RF transmissions 710. In one embodiment, the return signal 750 lasts for a duration of 100 μs.

The receiver 735 transmits a predetermined number of return signals 750 then terminates the second period of RF transmissions 755. In the illustrated embodiment, the receiver 735 transmits a single return signal 750. In another embodiment (not shown), the receiver transmits multiple return signals, wherein each return signal is followed by a predetermined transmission interval or a randomly generated time interval.

Upon receipt of the return signal 750, as shown at 760, the handheld device 705 terminates the first period of RF transmissions 710. Alternatively, if no return signal is received, the handheld device 705 may automatically terminate the first period of RF transmissions 710 after a predetermined time elapses. In one embodiment, the predetermined time limit is eight (8) seconds. In this embodiment, the first period of RF transmissions 710 has a duration of 100 microseconds to eight (8) seconds.

After the first and second periods of RF transmissions 725, 755 are terminated, another distinct period of no RF transmissions follows. In an alternative embodiment (not shown), the handheld device 710 may transmit an RF signal at a first frequency and the receiver 740 may transmit an acknowledgment signal at a second frequency.

Figure 8:
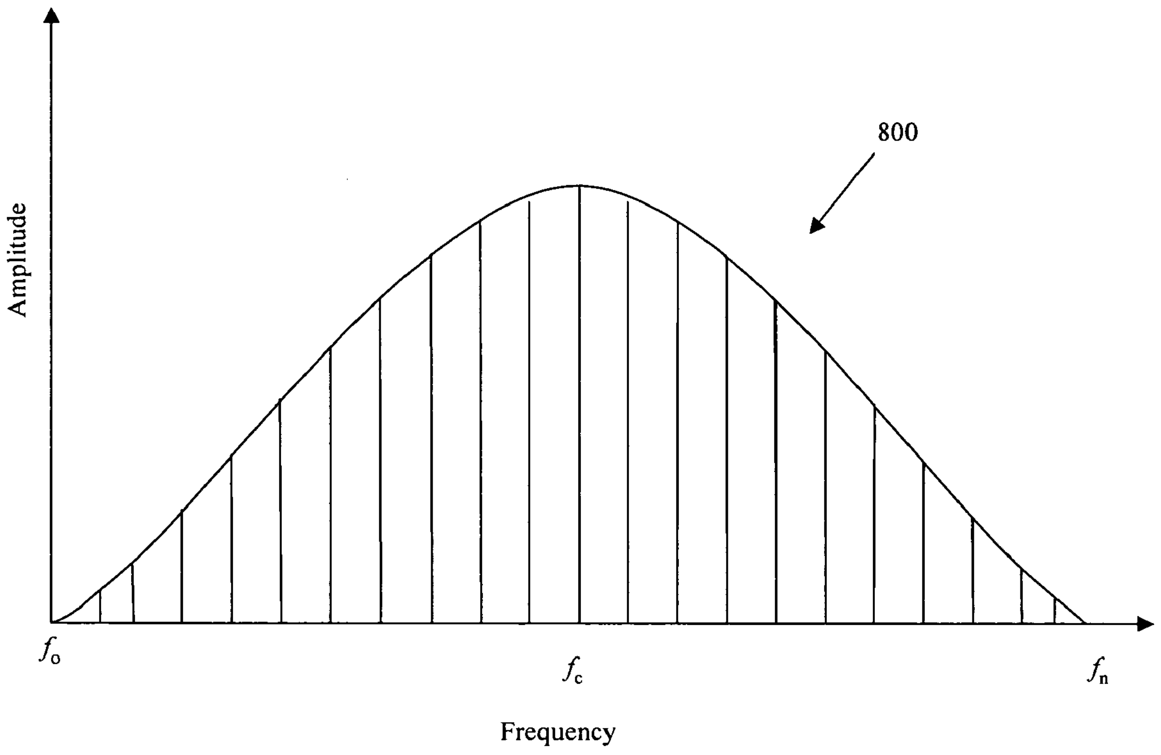
FIG. 8 is a simplified illustration of one embodiment of an RF signal spread on a selected frequency band.

FIG. 8 illustrates one embodiment of an RF signal spread 800 on a selected frequency band. In this embodiment, the RF signal spread 800 covers a range of frequencies from $f_o$ to $f_n$. When a handheld device or a receiver transmits on a selected frequency band, a signal is transmitted that may be centered on a frequency $f_c$ while spread over $f_o$ to $f_n$. The signal is strongest, and therefore has the highest amplitude, on frequency $f_c$ at the center of the frequency band. The signal amplitude decreases at frequencies further from $f_c$ as shown in the illustrated embodiment. Both a handheld device and a receiver may transmit signals over this illustrated RF signal spread, or the handheld device and the receiver may transmit signals centered on different frequencies.

While the present application has been illustrated by the description of embodiments thereof, and while the embodiments have been described in some detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, on the illustrative embodiments shown and described. Accordingly, departures may be made from such details without departing from the spirit or scope of the applicant's general inventive concept.

The invention claimed is:

1. A wireless communication system comprising:

a plurality of handheld devices, each handheld device including:

a transmitter, an input selection control, and a processor configured to receive a user selection from the input selection control; and upon receipt of the user selection, communicate instructions to the transmitter to transmit an RF signal encoding an address and the user selection according to a defined RF profile, wherein the defined RF profile comprises a distinct period of no RF transmission, and a first period of RF transmission corresponding to transmission of the RF signal, where the first period of RF transmission occurs after the distinct period of no RF transmission and is responsive to receipt of the user selection from the input selection control; and a receiver including a transceiver configured for data communication with a processor.

2. The wireless communication system of claim 1, wherein each handheld device further includes a computer-readable medium configured to store an address, and wherein the processor of each handheld device is further configured to communicate instructions to the transmitter to transmit an RF signal encoding the address and the user selection.

3. The wireless communication system of claim 2, wherein the processor of the receiver is configured to decode the RF signal into the address and the user selection following receipt by the transceiver.

4. The wireless communication system of claim 1, wherein the processor of the receiver is configured to store the user selection in a computer-readable medium.

5. The system of claim 1, wherein the defined RF profile further comprises:

a second period of RF transmission corresponding to transmission of an acknowledgment, where the second period of RF transmission occurs after the start of the first period and is responsive to receipt of the RF signal by the receiver.

6. The system of claim 1, wherein the first period of RF transmission has a duration of 100 microseconds to 8 seconds.

7. The RF profile as set forth in claim 5, wherein the second period of RF transmission has a duration of 100 microseconds.

8. The system of claim 5, wherein the second period of RF transmission is followed by a distinct period of no RF transmission.

9. The system of claim 1, wherein the defined RF profile includes a transmission interval separating periodic retransmissions of the RF signal.

10. The system of claim 1, wherein each handheld device further includes at least one battery configured to provide no more than 25 mA DC current.

11. The system of claim 1, wherein the transmitter is configured to draw a DC current of less than 15 mA when transmitting the RF signal.

12. The system of claim 1, wherein the receiver is configured to draw a DC current less than 25 mA.

13. The system of claim 5, wherein the receiver is configured to draw a DC current of less than 25 mA when receiving the RF signal and a DC current of less than 15 mA when transmitting the acknowledgment.

* * * * *

UNITED STATES PATENT AND TRADEMARK OFFICE

CERTIFICATE OF CORRECTION

| | | |
|---|---|---|
| PATENT NO. | : 7,330,716 B2 | Page 1 of 1 |
| APPLICATION NO. | : 11/336361 | |
| DATED | : February 12, 2008 | |
| INVENTOR(S) | : Kevin G. Adkins | |

It is certified that error appears in the above-identified patent and that said Letters Patent is hereby corrected as shown below:

Column 9, line 55, the term "signal" should read --signal 710--;

Column 9, line 64, and column 10, lines 9, 11, and 14, for the reference numeral "710", each occurrence should read --725--;

Column 10, line 19, the reference numeral "710" should read --705--; and

Column 10, line 20, the reference numeral "740" should read --735--.

Signed and Sealed this

Twenty-sixth Day of August, 2008

JON W. DUDAS

*Director of the United States Patent and Trademark Office*

US007330716C1

(12) EX PARTE REEXAMINATION CERTIFICATE (10771st)

United States Patent
Adkins

(10) Number: US 7,330,716 C1

(45) **Certificate Issued: *Dec. 2, 2015**

(54) WIRELESS COMMUNICATION SYSTEM

(75) Inventor: Kevin G. Adkins, Akron, OH (US)

(73) Assignee: Responsive Innovations, LLC

Reexamination Request:
No. 90/013,278, Jun. 27, 2014

Reexamination Certificate for:

| | |
|---|---|
| Patent No.: | **7,330,716** |
| Issued: | **Feb. 12, 2008** |
| Appl. No.: | **11/336,361** |
| Filed: | **Jan. 20, 2006** |

Certificate of Correction issued Aug. 26, 2008

( * ) Notice: This patent is subject to a terminal disclaimer.

Related U.S. Application Data

(60) Provisional application No. 60/645,021, filed on Jan. 21, 2005.

(51) Int. Cl.

| | |
|---|---|
| ***H04M 3/42*** | (2006.01) |
| ***H04B 1/3827*** | (2015.01) |

(52) U.S. Cl.
CPC .................................... *H04B 1/3833* (2013.01)

(58) Field of Classification Search
None
See application file for complete search history.

(56) References Cited

To view the complete listing of prior art documents cited during the proceeding for Reexamination Control Number 90/013,278, please refer to the USPTO's public Patent Application Information Retrieval (PAIR) system under the Display References tab.

*Primary Examiner* — Roland Foster

(57) ABSTRACT

A wireless communication system is disclosed herein. The wireless communication system may include transmitter units and a receiver. In one embodiment, each transmitter has an address and logic programmed to perform the steps of receiving a user selection and, responsive to the receiving, repeatedly transmitting a wireless selection signal until a wireless acknowledgment signal is received. The wireless selection signal may include the address and the user selection. The receiver may include means to receive a wireless selection signal and logic programmed to transmit a wireless acknowledgment signal in response to the receipt of each wireless selection signal.

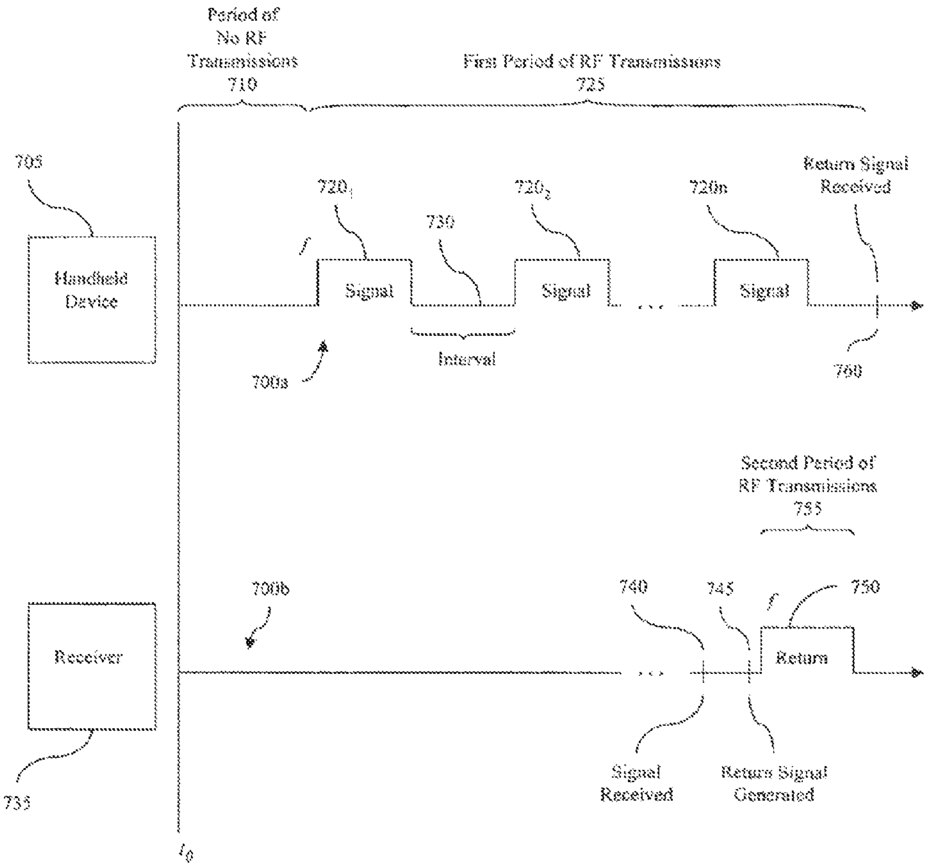

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-6, 8 and 9, dependent on an amended claim, are determined to be patentable.

Claims 7 and 10-13 were not reexamined.

1. A wireless communication system comprising:

a plurality of handheld devices, each handheld device including:

a transmitter, an input selection control, and a processor configured to receive a user selection from the input selection control; and upon receipt of the user selection, communicate instructions to the transmitter to transmit an RF signal encoding an address and the user selection according to a defined RF profile, wherein the defined RF profile comprises a distinct period of no RF transmission, and a first period of RF transmission corresponding to transmission of the RF signal, where the first period of RF transmission occurs after the distinct period of no RF transmission and is responsive to receipt of the user selection from the input selection control; and a receiver including a transceiver configured for data communication with a processor*,*

*wherein the defined RF profile provides a rule that a first RF communication between a handheld device and the receiver must be initiated by the handheld device.*

* * * * *